US011092537B2

(12) United States Patent
Arvis et al.

(10) Patent No.: US 11,092,537 B2
(45) Date of Patent: Aug. 17, 2021

(54) METHOD FOR ESTIMATING AN ADHESION GRADE BETWEEN THE RUBBER COMPOSITION AND THE REINFORCING PLIES OF A TEST SPECIMEN REPRESENTATIVE OF A TIRE TO BE CHARACTERIZED

(71) Applicant: COMPAGNIE GENERALE DES ETABLISSEMENTS MICHELIN, Clermont-Ferrand (FR)

(72) Inventors: Vincent Arvis, Clermont-Ferrand (FR); Pierre Maginier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/758,657

(22) PCT Filed: Oct. 16, 2018

(86) PCT No.: PCT/EP2018/078241
§ 371 (c)(1),
(2) Date: Apr. 23, 2020

(87) PCT Pub. No.: WO2019/081278
PCT Pub. Date: May 2, 2019

(65) Prior Publication Data
US 2021/0181087 A1 Jun. 17, 2021

(30) Foreign Application Priority Data

Oct. 23, 2017 (FR) ...................................... 1759990

(51) Int. Cl.
*G01N 19/04* (2006.01)
*G06T 7/174* (2017.01)
(Continued)

(52) U.S. Cl.
CPC ........... *G01N 19/04* (2013.01); *G06T 7/0004* (2013.01); *G06T 7/174* (2017.01); *G06T 7/62* (2017.01);
(Continued)

(58) Field of Classification Search
CPC combination set(s) only.
See application file for complete search history.

(56) References Cited

U.S. PATENT DOCUMENTS

2009/0281738 A1* 11/2009 Fujisawa .............. G01B 11/306
702/35
2011/0303337 A1* 12/2011 Michiels .................. B60C 9/18
152/536

(Continued)

*Primary Examiner* — Zhiyu Lu
(74) *Attorney, Agent, or Firm* — Venable LLP

(57) ABSTRACT

A method comprises steps in which: the specimen is baked under pressure then put into the expected format, a stripping test is carried out by peeling apart two reinforcing plies, at least one image is acquired of the two half-specimens obtained at the end of the stripping test, the acquired images are trimmed, a first image separating reinforcement regions from regions of rubber composition is then determined, a second image is determined depending on the spacing and on the diameter of the reinforcing cords of the tire, among a theoretical image and a fitted theoretical image, and a score depending on the ratio of the area of the reinforcing cords in the first image to the area of the reinforcing cords in the second image is determined.

12 Claims, 7 Drawing Sheets

19

21

22

(51) Int. Cl.
*G06T 7/00* (2017.01)
*G06T 7/62* (2017.01)

(52) U.S. Cl.
CPC ............. *G06T 2207/10008* (2013.01); *G06T 2207/20036* (2013.01); *G06T 2207/20112* (2013.01); *G06T 2207/30108* (2013.01)

(56) References Cited

U.S. PATENT DOCUMENTS

| | | | | |
|---|---|---|---|---|
| 2012/0211139 A1* | 8/2012 | Li | ............................. | C08L 21/02 |
| | | | | 152/537 |
| 2012/0214372 A1* | 8/2012 | Li | ............................. | C08L 21/02 |
| | | | | 442/59 |
| 2016/0339658 A1* | 11/2016 | Tada | .................. | B29D 30/0061 |
| 2018/0352659 A1* | 12/2018 | Hayashi | ............... | H05K 1/0373 |

* cited by examiner

METHOD FOR ESTIMATING AN ADHESION GRADE BETWEEN THE RUBBER COMPOSITION AND THE REINFORCING PLIES OF A TEST SPECIMEN REPRESENTATIVE OF A TIRE TO BE CHARACTERIZED

BACKGROUND

The technical field of the invention is image processing and more particularly image processing applied to quality control, especially in the manufacture of tyres.

A tyre generally comprises a tread that makes direct contact with the road, said tread being provided with grooves and tread blocks and resting on a carcass that lends its strength to the tyre.

The carcass may be diagonal or radial, and comprises a superposition of plies of reinforcing fibres embedded in the rubber composition. A ply is a layer of essentially parallel reinforcing fibres.

During the development of tyres, or when monitoring their quality, it is commonplace to test the adhesion between the rubber composition and the (textile or metal) reinforcing plies.

To carry out an adhesion test, a specimen is manufactured with the same constituents and the same processes as a tyre for which the adhesion between the rubber composition and the reinforcing plies is to be tested. The specimen thus obtained is then baked under pressure, then put into the expected format.

This specimen then undergoes stripping by peeling two reinforcing plies united by the rubber composition, during which the tensile force required to separate them is measured. At the end of the stripping, the tested specimen has separated into two half-specimens. An operator then attributes a score to the specimen depending on the visual appearance of the half-specimens and on the degree of coverage of the reinforcement by the rubber composition.

However, the reproducibility of the method described above and the reliability of the obtained data are variable because of the visual inspection by a human operator.

The following documents are known from the prior art.

The document "AFNOR—NF ISO 36—November 2011" discloses the features of French standard NF ISO 36 relating to a test method for measuring the force required to separate, by peeling, two textile plies united by rubber or a rubber layer joined to a textile ply.

The document "ASTM Standards—StandardTest Method for Strap Peel Adhesion of Reinforcing Cords or Fabrics to Rubber Compounds—D4393/D4393M—10" discloses standardized methods for measuring the adhesion of tyre reinforcements through stripping tests. Mention is made therein of visual scoring by a human operator. The use of an automatic method to evaluate the degree of coverage of the reinforcement by the rubber composition was broached in the internship report "Brendan Le Bouil—*Caractérisation de l'adhesion tissu/composition de caoutchouc de pneumatiques par traitement d'images numéiques—Laboratoire IMS*—MICHELIN—Internship Report, September 2014", which describes a study of the feasibility a of segmentation between textile reinforcements and the rubber composition in images of specimens, though a complete method was not developed.

The presented segmentation was based on an SLIC superpixel algorithm (SLIC being the acronym of simple linear iterative clustering), associated with grouping of the superpixels. This segmentation technique is not always effective, because of problems with aligning the specimens.

The code of the SLIC superpixel algorithm was written after the publication by Radhakrishna Achanta, Appu Shaji, Kevin Smith, Aurelien Lucchi, Pascal Fua, and Sabine Süsstrunk, "SLIC Superpixels Compared to State-of-the-art Superpixel Methods", IEEE Transactions on Pattern Analysis and Machine Intelligence, vol. 34, num. 11, p. 2274-2282, May 2012.

The document also notes that the presence of "bridges of rubber composition" is a stumbling block to the industrialization of segmentation in the inspection of adhesion between reinforcing layers.

There is a need for a method for estimating a score depending on the degree of coverage of the reinforcement by the rubber composition after a stripping test in which a specimen is peeled that has an improved reproducibility and an improved objectivity.

SUMMARY

One subject of the invention is a method for estimating a score of adhesion between the rubber composition and the reinforcing plies of a specimen representative of a tyre to be characterized, the specimen comprising at least two reinforcing plies embedded in the rubber composition, each reinforcing ply itself comprising reinforcing cords placed beside one another.

The method comprising the following stages:

the specimen is baked under pressure, then a stripping test is carried out by peeling apart two reinforcing plies of the specimen.

The method furthermore comprises the following stages:

at least one image is acquired of the two half-specimens obtained at the end of the stripping by peeling test, the acquired images are trimmed, a first image separating reinforcement regions from regions of rubber composition is then determined depending on the trimmed acquired images via superpixel decomposition, a first image being chosen among a segmentation binary mask image, a folded binary mask image, a modified segmentation binary mask image, a modified folded binary mask image and an aligned folded binary mask image, a second image of the reinforcing cords is determined depending on the spacing and on the diameter of the reinforcing cords of the tyre, a second image being chosen among a theoretical image and a fitted theoretical image, a score depending on the ratio to the area of the reinforcing cords in the first image to the area of the reinforcing cords in the second image is determined.

The images of the half-specimens may be acquired with a flatbed scanner.

The images of the half-specimens may be acquired with a flatbed scanner in conjunction with the use of a rigid half-specimen holder allowing the way in which each half-specimen is pressed against the window of the scanner and their alignment in the acquisition region of the scanner to be controlled.

To trim the acquired images, steps in which the colour components of the acquired image are removed so as to obtain a greyscale image may be carried out, then a greyscale threshold is applied so that pixels having greyscales lower than the threshold are attributed a first Boolean value, pixels having greyscales higher than or equal to the threshold being attributed a second Boolean value, the greyscale threshold being chosen so as to remove the background image and preserve the image of the specimens, a binary mask of same size as the greyscale image is determined, in which mask each pixel of the image to be trimmed is associated with the first or second Boolean value, closing morphological filtering is carried out on the binary mask in order to join the half-specimens, opening morphological filtering is carried out on the filtered binary mask obtained beforehand in order to remove noise.

To determine a first image such as a segmentation binary mask image, it is possible to carry out steps in which a superpixel decomposition is applied to the trimmed image, then a segmentation binary mask containing superpixels having both an eccentricity higher than an eccentricity threshold and a brightness higher than a brightness threshold is determined.

To determine a second image such as a fitted theoretical image, steps may be carried out in which an AND logic operation is carried out between a segmentation mask image and the theoretical image, then the deviation in position between the cords of the theoretical image and those of the segmentation binary mask image is measured by taking the sum of pixels of non-zero Boolean value, the measurement of the deviation being repeated in an interval of values of pitch and of positions of the first cord that are defined beforehand about initial values, the values of pitch and of positions of the first cord associated with the highest value among the determined deviation values are retained, a fitted theoretical image is then determined depending on the retained values of pitch of the cords and of position of the first cord and on their diameter.

To determine a first image such as a modified segmentation binary mask image, steps may be carried out in which if a fitted theoretical image is not available, the segmentation binary mask is expanded using a structuring element representing a horizontal line of width depending on the distance between two reinforcing cords and on the diameter of a reinforcing cord, then an AND logic operation is then carried out between the theoretical image of the reinforcing cords and the image obtained at the end of the expansion so as to obtain an image referred to as the expanded segmentation binary mask image, a linewise morphological reconstruction is then carried out with, as marker, the expanded segmentation binary mask image and, as mask, the theoretical image in order to obtain a modified segmentation binary mask image, if a fitted theoretical image is available, the segmentation binary mask is expanded using a structuring element representing a horizontal line of width depending on the distance between two reinforcing cords and on the diameter of a reinforcing cord, then an AND logic operation is then carried out between the fitted theoretical image of the reinforcing cords and the image obtained at the end of the expansion so as to obtain an image referred to as the expanded segmentation binary mask image, a linewise morphological reconstruction is then carried out with, as marker, the expanded segmentation binary mask image and, as mask, the fitted theoretical image in order to obtain a modified segmentation binary mask image.

To determine a first image such as a folded binary mask in order to avoid false positives, steps may be carried out in which a horizontal mirroring operation is carried out on the lower portion of the segmentation binary mask image corresponding to one half-specimen, a folded binary mask image is determined by carrying out an OR logic operation between each pixel of the upper half-mask and each pixel of the horizontal mirror of the lower half-mask, so as to superpose the pixels corresponding to reinforcing cords visible in the two half-specimens.

To determine a second image such as a fitted theoretical image, steps may be carried out in which an AND logic operation is carried out between the folded binary mask image and the theoretical image, then the deviation in position between the cords of the theoretical image and those of the folded binary mask image is measured by taking the sum of pixels of non-zero Boolean value, the measurement of the deviation being repeated in an interval of values of pitch and of positions of the first cord that are defined beforehand about initial values, the values of pitch and of positions of the first cord associated with the highest value among the determined deviation values are retained, a fitted theoretical image is then determined depending on the retained values of pitch of the cords and of position of the first cord and on their diameter.

To determine a second image such as a modified folded image, steps may be carried out in which if a fitted theoretical image is not available, the folded binary mask image is expanded using a structuring element representing a horizontal line of width depending on the distance between two reinforcing cords and on the diameter of a reinforcing cord, then an AND logic operation is then carried out between the theoretical image of the reinforcing cords and the image obtained at the end of the expansion so as to obtain an image referred to as the expanded folded binary mask image, a linewise morphological reconstruction is then carried out with, as marker, the expanded folded binary mask image and, as mask, the theoretical image in order to obtain a modified folded image, if a fitted theoretical image is available, the folded binary mask image is expanded using a structuring element representing a horizontal line of width depending on the distance between two reinforcing cords and on the diameter of a reinforcing cord, then an AND logic operation is then carried out between the fitted theoretical image of the reinforcing cords and the image obtained at the end of the expansion so as to obtain an image referred to as the expanded folded binary mask image, a linewise morphological reconstruction is then carried out with, as marker, the expanded folded binary mask image and, as mask, the fitted theoretical image in order to obtain a modified folded binary mask image.

Two segmentation binary mask half-images may be determined from the segmentation binary mask image, and for each segmentation binary mask half-image, a theoretical half-image may be determined, a fitted theoretical half-image may be determined depending on the theoretical half-image and the segmentation binary mask half-image, and an expanded segmentation binary mask half-image may be determined depending on the segmentation binary mask half-image and the fitted theoretical half-image, then a horizontal mirroring operation may be carried out on the expanded segmentation binary mask half-image corresponding to the lower portion of the segmentation binary mask image and to one half-specimen, a horizontal offset may be applied to the image of the half-specimen resulting from the horizontal mirroring operation, a folded binary mask image may be determined by carrying out an OR logic operation between each pixel of the upper half-mask and each pixel of the horizontal mirror of the lower half-mask, so as to superpose the pixels corresponding to reinforcing cords visible in the two half-specimens.

At least two scores each corresponding to one horizontal offset may be determined, then a final score may be determined as the minimum score among all of the scores obtained for each horizontal offset.

BRIEF DESCRIPTION OF THE FIGURES

Other objectives, features and advantages of the invention will become apparent on reading the following description given solely by way of nonlimiting example and with reference to the appended drawings in which.

DETAILED DESCRIPTION

The invention consists in replacing the visual inspection of specimens after traction and the attribution of a score with an automatic inspection and score attribution, in order to improve the reproducibility and the comparison of the results of observation.

To do this, an image is acquired by means of an image-acquiring device, then image-analysing methods are employed in order to measure the area of reinforcement visible, and a score is attributed by way of the determination of a degree of coverage, this determination resulting from the comparison of measurement and of the theoretical value of the area of the reinforcements.

The estimating method comprises a first step 1 in which at least one image of two half-specimens obtained from one and the same specimen is acquired.

To carry out the image acquisition, any image-acquiring device may be employed, such as a camera, a photographic sensor, or a scanner, especially a flatbed scanner such as generally used in an office setting. Use of a scanner in conjunction with use of a rigid half-specimen holder will be preferred as this allows field-depth effects to be limited by virtue of correct pressing of each half-specimen against the window of the scanner and the alignment of the half-specimens to be improved by virtue of correct alignment in the acquisition region of the scanner. Image acquisition by scanner allows the contrast between the various constituents of the half-specimens in the acquired images to be increased (colour contrast in the case of textile, brightness contrast in the case of metal).

More precisely, to carry out the acquisition of images, the half-specimens are placed on the window of a flatbed scanner by means of a rigid holder fastened beforehand to the window of the scanner and aligned with respect to the direction of image acquisition.

The rigid holder comprises at least one aperture that is the same size as a half-specimen and allows them to be correctly positioned by limiting the lateral travel thereof. Since the holders are aligned, the half-specimens are also. Each rigid holder may comprise at least one rigid plate per aperture, able to be screwed to said holder in order to press the corresponding half-specimens against the window of the scanner. Specifically, despite the bake under pressure, the half-specimens preserve a curvature.

The number of half-specimens able to be the subject of a simultaneous acquisition is limited only by the area of the image-acquiring device.

The estimating method continues with a second step, in which the acquired images are trimmed.

Specifically, image acquisition by a flatbed scanner generally occurs in the entirety of the area of its window. Trimming is then necessary to limit the acquired images to the area of the specimens.

To trim the acquired images the colour components of the image are removed so as to obtain a greyscale image.

Next, a greyscale threshold is applied so that pixels having greyscales lower than the threshold are attributed a first Boolean value, 0 for example, pixels having greyscales higher than or equal to the threshold being attributed a second Boolean value, 1 for example.

The threshold is selected so as to remove the background image and preserve the image of the specimens.

This results in a binary mask image of same size as the greyscale image, in which mask each pixel of the image to be trimmed is associated with the first or second Boolean value.

Next, closing morphological filtering is carried out on the binary mask image in order to join the half-specimens. To do this, a structuring element of vertical line shape and of length equal to the interval between half-specimens is used.

Next, opening morphological filtering is carried out on the filtered binary mask image obtained beforehand in order to remove noise. To do this, a structuring element of square shape and of size equal to the largest parasitic element to be removed is used.

A single image containing the images of the two half-specimens obtained in the stripping test from a given specimen is obtained.

Figure 8:
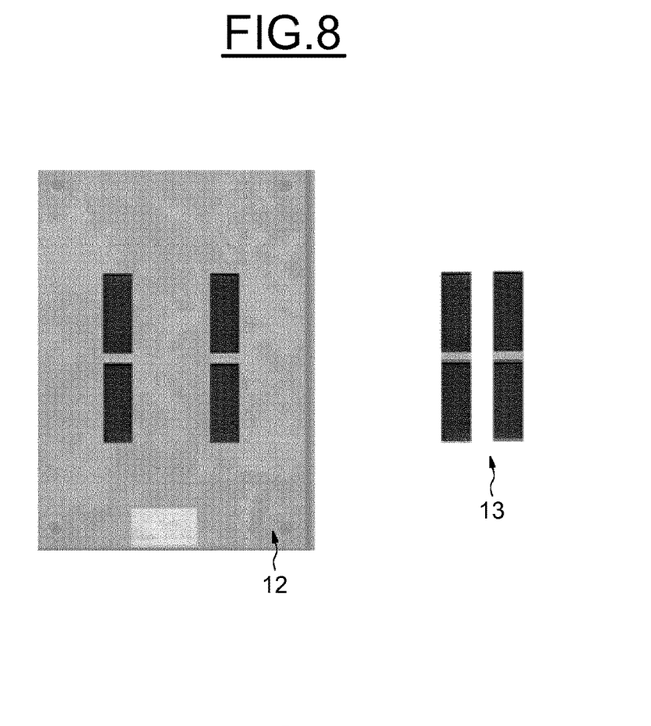
FIG. 8 illustrates the image obtained after a trimming step applied to an acquired image.

FIG. 8 illustrates such a trimming step with the acquired image, which is referenced 12, and the image after trimming, which is referenced 13.

Alternatively, it is possible to limit the acquisition area of the flatbed scanner to the apertures of the pre-positioned rigid holders alone, depending on their coordinates in the acquisition area of the scanner.

Next, a segmentation binary mask image is determined in a third step.

The determination of a segmentation binary mask image consists in separating the portions of an image corresponding to the reinforcement from the portions of the same image corresponding to the rubber composition in order to obtain a partition of the image taking the form of a segmentation binary mask image. Specifically, the portions corresponding to the rubber composition are attributed a first Boolean value, whereas the portions corresponding to the reinforcement are attributed a second Boolean value.

To obtain the segmentation binary mask image, a superpixel decomposition is applied to the image resulting from the second step, by applying an SLIC algorithm. A pseudo-regular partition of the image, composed of superpixels of various shapes and colours, is obtained. A superpixel is determined by grouping adjacent pixels having similar (colour, brightness) characteristics.

The SLIC algorithm is an iterative process that deforms a regular partition (a grid) in order to optimize a predefined condition depending on the characteristics of the image. The size of the starting grid and the permitted amount of deformation are parameterizable.

Figure 9:
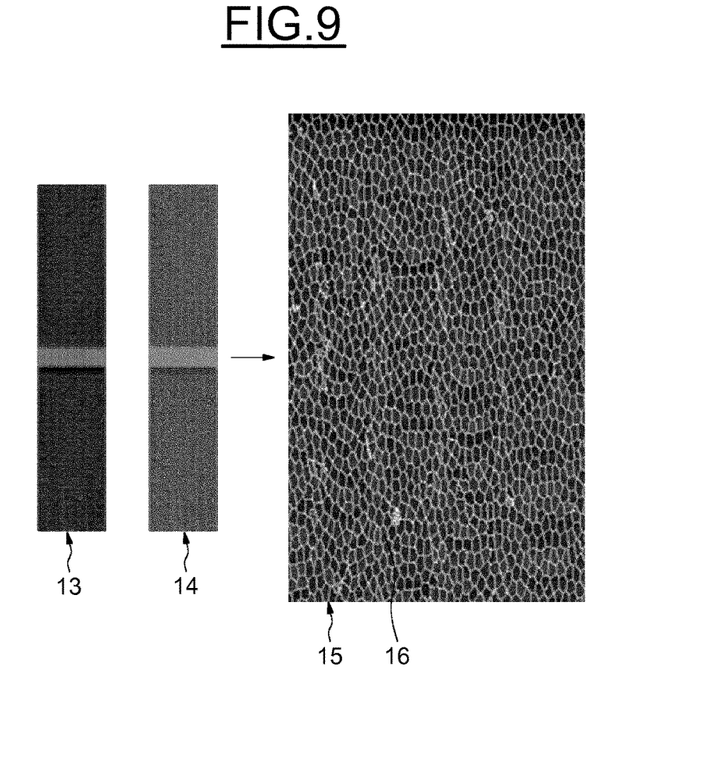
FIG. 9 illustrates an image resulting from a superpixel decomposition.
Figure 10:
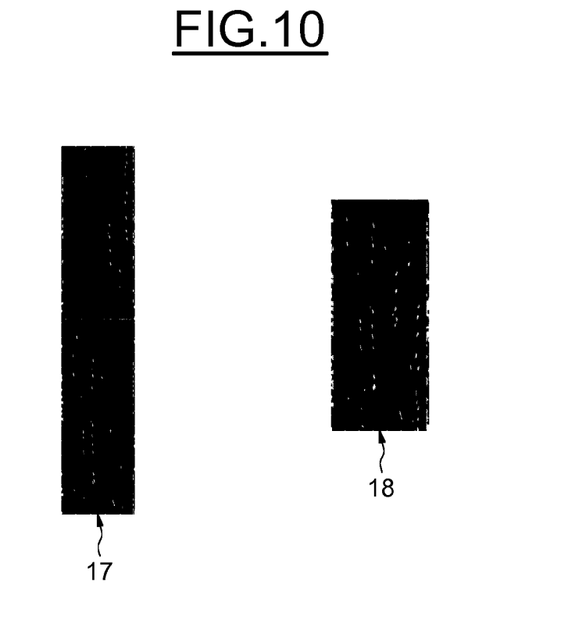
FIG. 10 illustrates a binary mask resulting from the classification of superpixels depending on their eccentricity and their mean brightness and a folded binary mask.

FIG. 9 illustrates an image resulting from a superpixel decomposition, referenced 14, obtained from an image after trimming, referenced 13. FIG. 9 also comprises a magnification 15 of one portion of the image 14 resulting from a superpixel decomposition, in which the superpixels 16 may be more easily seen.

A sorting process based on the eccentricity and the mean brightness of the superpixels is an effective way of achieving a partition and allows the desired binary mask image to be obtained.

To do this, each superpixel is considered to be a connected component of the image, of which characteristics may be measured. Thus, the eccentricity of each superpixel, which corresponds to the eccentricity of the ellipse having the same moment of order 2 as the superpixel, is computed. This criterion therefore expresses the elongation of the superpixel. Next, the eccentricity of each superpixel is compared to a threshold, a first Boolean value being associated with superpixels the eccentricity of which is higher than the threshold, and a second Boolean value being associated with superpixels the eccentricity of which is lower than or equal to the threshold.

Moreover, the mean brightness of each superpixel is determined by dividing determining the arithmetic mean of the brightness of each pixel from which it is composed. Next, the mean brightness of each superpixel is compared to a threshold, a first Boolean value being associated with superpixels the mean brightness of which is higher than the threshold, and a second Boolean value being associated with superpixels the mean brightness of which is lower than or equal to the threshold.

Next, a binary mask image containing superpixels having both an eccentricity higher than the eccentricity threshold and a brightness higher than the brightness threshold is determined. This binary mask image is determined by carrying out an AND logic operation between each pixel of the eccentricity binary mask image and each corresponding pixel of the mean-brightness binary mask image.

More precisely, the superpixels corresponding to the rubber composition are considered to have a lower eccentricity and mean brightness than those of superpixels corresponding to the reinforcements. The obtained binary mask image contains a first Boolean value for each pixel within a superpixel associated with a reinforcing cord and a second Boolean value for each pixel within a superpixel associated with the rubber composition.

The binary mask image thus obtained is the segmentation binary mask image.

Figure 7:
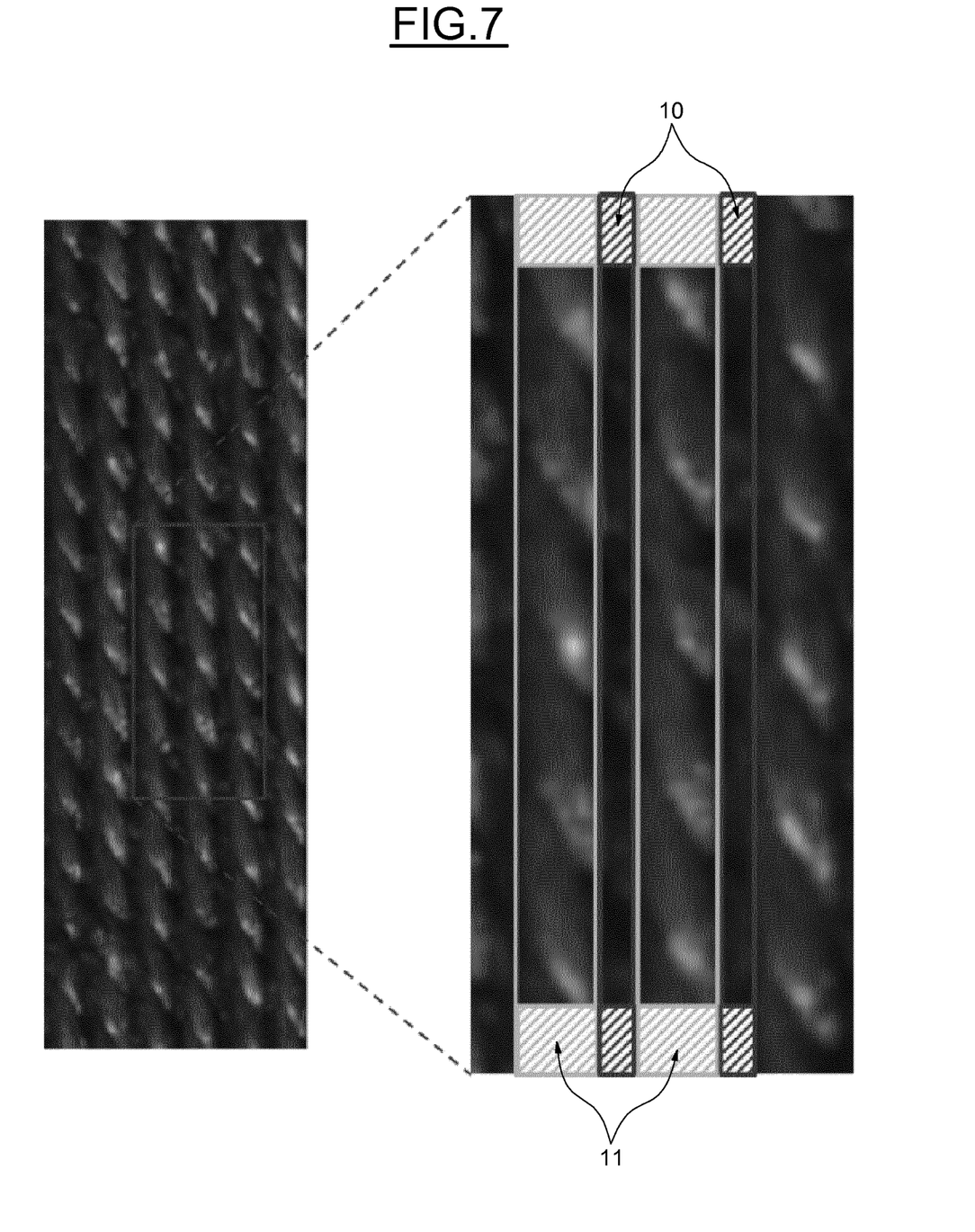
FIG. 7 illustrates the bridges of rubber composition and the reinforcing cords of a specimen.

From this segmentation binary mask image, a plurality of embodiments allow the adhesion score to be obtained. At this point in the method, the image of the half-specimens is not exploitable because of the presence of ridges of rubber composition. The reference area of the half-specimens allowing the degree of coverage by the rubber composition to be computed does not correspond to their total area. Specifically, only the area of the reinforcement counts. It is therefore necessary to remove the bridges of rubber composition that are located between the cords and that are referenced 10 in FIG. 7. The cords are referenced 11 in the same figure.

Figure 1:
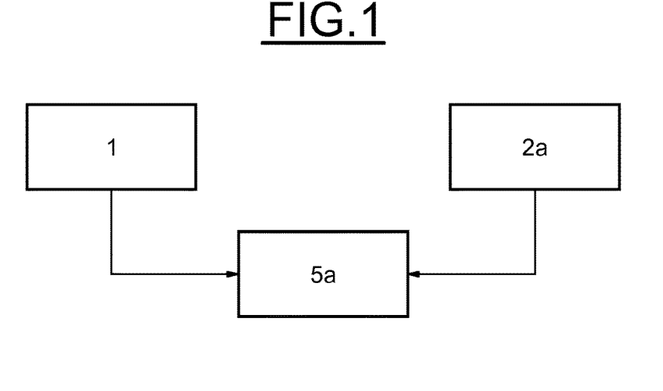
FIG. 1 illustrates the main steps of a first embodiment of an estimating method according to the invention.

In a first embodiment illustrated in FIG. 1, in a step 2$a$ of generating a theoretical image, a theoretical model is used to make the image of the half-specimens exploitable by giving them a reference area that corresponds to the reinforcement alone.

Figure 11:
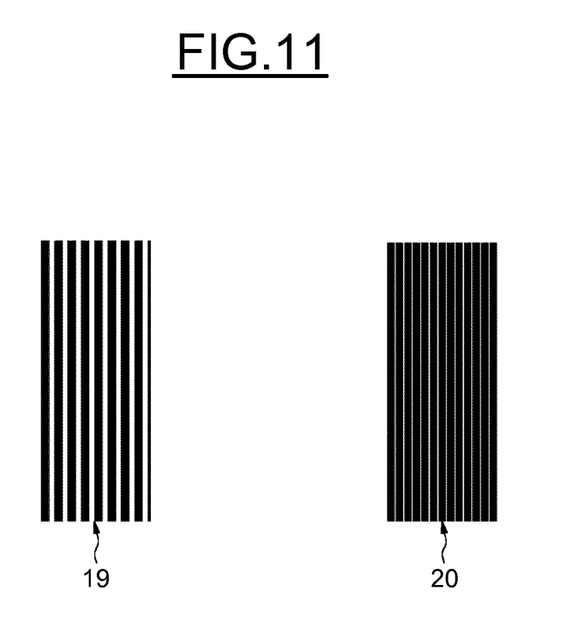
FIG. 11 illustrates two examples of theoretical images of reinforcing cords with different values of pitch and diameter.

Since the pitch of the reinforcing cords and their diameter in the specimen and the pixels/mm transfer function of the image-acquiring device are known, it is possible to generate a theoretical image of the bare reinforcing cords. By reinforcing cord, what is meant is the textile or metal reinforcing fibres of a reinforcing layer used in the production of the specimen. FIG. 11 illustrates two examples 19, 20 of theoretical images of reinforcing cords with different values of pitch and diameter.

The estimating method ends with a fifth step 5$a$ of determining a score N quantifying the degree of overlap of the reinforcing cords and of the rubber composition:

$$N = 1 - \text{(segmentation binary mask image metal area)} / \text{(theoretical image metal area)}$$

It will be noted that when a binary mask is considered, an area is determined as the sum of the values of the pixels of the mask.

Figure 2:
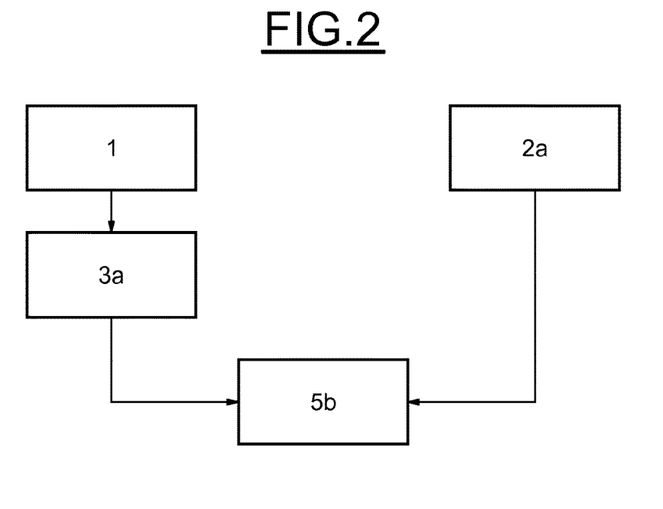
FIG. 2 illustrates the main steps of a second embodiment of an estimating method according to the invention.

In a second embodiment illustrated in FIG. 2, in a step 2$a$ of generating a theoretical image, a theoretical model is used to make the image of the half-specimens exploitable by giving them a reference area that corresponds to the reinforcement alone.

Since the pitch of the reinforcing cords and their diameter in the specimen and the pixels/mm transfer function of the image-acquiring device are known, it is possible to generate a theoretical image of the bare reinforcing cords. By reinforcing cord, what is meant is the textile or metal reinforcing fibres of a reinforcing layer used in the production of the specimen.

In order to avoid reinforcing regions from being counted twice (once per half-specimen), which could lead to a negative score (having no physical meaning), the method continues with a folding third step 3a in which the two following substeps are carried out.

In a first substep, a horizontal mirroring operation is carried out on the lower portion of the segmentation binary mask image corresponding to one half-specimen.

In a second substep, a folded binary mask image is determined by carrying out an OR logic operation between each pixel of the upper half-mask and each pixel of the horizontal mirror of the lower half-mask, so as to superpose the pixels corresponding to reinforcing cords visible in the two half-specimens.

The estimating method then ends with a fifth step 5b of determining a score N quantifying the degree of overlap of the reinforcing cords and of the rubber composition:

$$N=1-\text{(folded binary mask image metal area)}/\text{(theoretical image metal area)}$$

Figure 3:
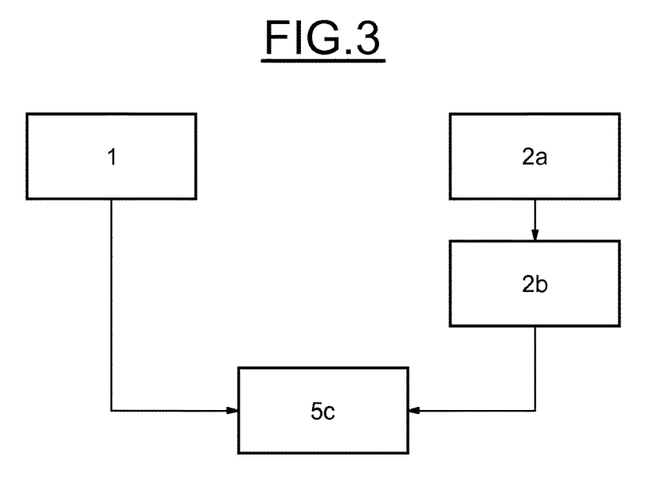
FIG. 3 illustrates the main steps of a third embodiment of an estimating method according to the invention.

In a third embodiment illustrated in FIG. 3, in a step 2a of generating a theoretical image, a theoretical model is used to make the image of the half-specimens exploitable by giving them a reference area that corresponds to the reinforcement alone.

Since the pitch of the reinforcing cords and their diameter in the specimen and the pixels/mm transfer function of the image-acquiring device are known, it is possible to generate a theoretical image of the bare reinforcing cords. By reinforcing cord, what is meant is the textile or metal reinforcing fibres of a reinforcing layer used in the production of the specimen.

A fitted theoretical image is determined in order to take into account differences between theoretical pitch and observed pitch while taking into account an offset of the first cord. This step allows the theoretical image and the grade that is derived therefrom to be improved.

To do this, a step 2b of fitting the theoretical image is carried out in which the cord pitch and the position of the first cord are varied about their initial values, which are defined in the theoretical model, in order to obtain a fitted theoretical image that best superposes on the folded binary mask image.

More precisely, step 2b of fitting the theoretical image comprises the following substeps.

An AND logic operation is carried out between the theoretical image and the segmentation binary mask image then the deviation in position between the cords of the theoretical image and those of the segmentation binary mask image is measured by taking the sum of pixels of non-zero Boolean value of the image obtained using the AND logic operation.

The measurement of this deviation is repeated by determining a new theoretical image having a value of pitch and of position of the first cord comprised in an interval of values of pitch and of positions of the first cord that are defined beforehand about initial values of the theoretical model. The values of pitch and of position of the first cord retained are those that lead to the highest deviation value.

Next, a fitted theoretical image is determined depending on the pitch of the cords and on the position of the first cord after variation and their diameter in the tyre.

The estimating method then ends with a fifth step 5c of determining a score N quantifying the degree of overlap of the reinforcing cords and of the rubber composition:

$$N=1-\text{(segmentation binary mask image metal area)}/\text{(fitted theoretical image metal area)}$$

Figure 4:
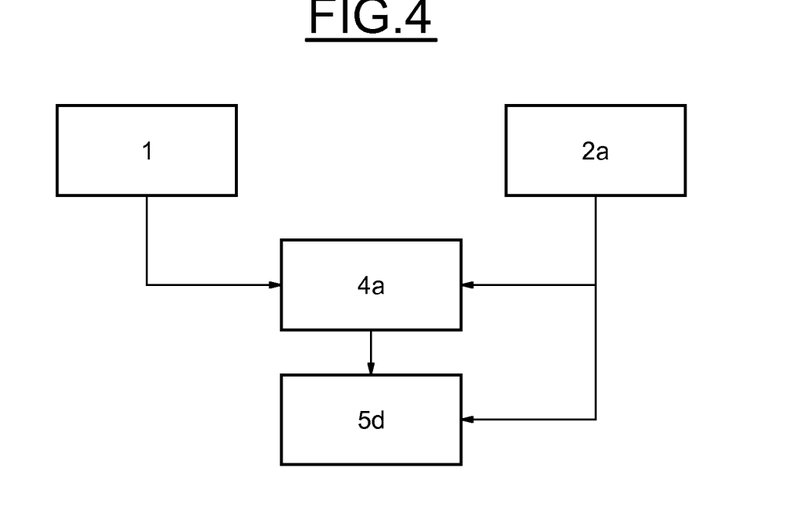
FIG. 4 illustrates the main steps of a fourth embodiment of an estimating method according to the invention.

In a fourth embodiment illustrated in FIG. 4, in a step 2a of generating a theoretical image, a theoretical model is used to make the image of the half-specimens exploitable by giving them a reference area that corresponds to the reinforcement alone.

Since the pitch of the reinforcing cords and their diameter in the specimen and the pixels/mm transfer function of the image-acquiring device are known, it is possible to generate a theoretical image of the bare reinforcing cords. By reinforcing cord, what is meant is the textile or metal reinforcing fibres of a reinforcing layer used in the production of the specimen.

The poor alignments between half-samples is compensated for by carrying out an expansion of the segmentation binary mask image in order to compensate for alignment errors in order to take into account the pieces of specimen cords not superposed with the theoretical model.

To do this, in a fourth step 4a, the segmentation binary mask image is expanded using a structuring element having a horizontal line shape of width F:

$$F=\text{intercord}-\text{diametercord}+1$$

where:
Intercord: distance between two reinforcing cords
Diametercord: diameter of a reinforcing cord.

Next, an AND logic operation is carried out between the expanded segmentation binary mask image and the theoretical image of the reinforcing cords so as to obtain an image referred to as the expanded segmentation binary mask image. This image contains information on the segments of the theoretical image that contain bare cords.

Next, a morphological reconstruction based on the expanded segmentation binary mask image is carried out.

On a horizontal line, any piece of bare cord must count as a line of cord. To take into account this assumption, a linewise morphological reconstruction is carried out with, as marker, the expanded segmentation binary mask image and, as mask, the theoretical image in order to obtain an image referred to as a modified segmentation binary mask image.

The estimating method then ends with a fifth step 5d of determining a score N quantifying the degree of overlap of the reinforcing cords and of the rubber composition:

$$N=1-\text{(modified segmentation binary mask image metal area)}/\text{(theoretical image metal area)}$$

Figure 5:
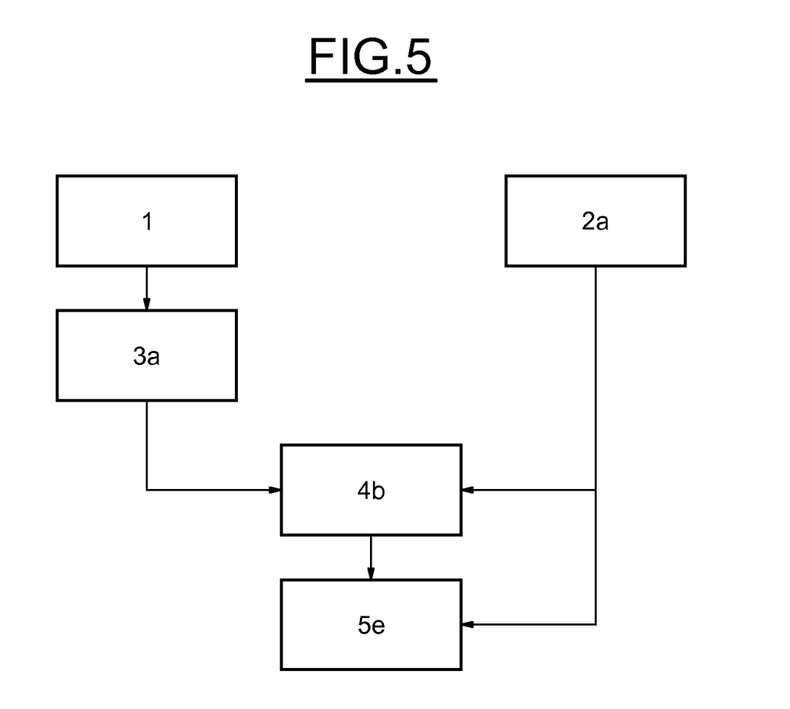
FIG. 5 illustrates the main steps of a fifth embodiment of an estimating method according to the invention.

In a fifth embodiment illustrated in FIG. 5, in a step 2a of generating a theoretical image, a theoretical model is used to make the image of the half-specimens exploitable by giving them a reference area that corresponds to the reinforcement alone.

Since the pitch of the reinforcing cords and their diameter in the specimen and the pixels/mm transfer function of the image-acquiring device are known, it is possible to generate a theoretical image of the bare reinforcing cords. By reinforcing cord, what is meant is the textile or metal reinforcing fibres of a reinforcing layer used in the production of the specimen.

The steps and advantages of the second, third and fourth embodiments are combined.

In a step of fitting the theoretical image, an AND logic operation is carried out between the theoretical image and the segmentation binary mask image then the deviation in position between the cords of the theoretical image and those of the segmentation binary mask image is measured by taking the sum of pixels of non-zero Boolean value of the image obtained using the AND logic operation.

The measurement of this deviation is repeated by determining a new theoretical image having a value of pitch and of position of the first cord comprised in an interval of values of pitch and of positions of the first cord that are defined beforehand about initial values of the theoretical model. The values of pitch and of position of the first cord retained are those that lead to the highest deviation value.

Next, a fitted theoretical image is determined depending on the pitch of the cords and on the position of the first cord after variation and their diameter in the tyre.

In a first substep of a folding third step 3a, a horizontal mirroring operation is carried out on the lower portion of the segmentation binary mask image corresponding to one half-specimen.

In a second substep of a folding third step 3a, a folded binary mask image is determined by carrying out an OR logic operation between each pixel of the upper half-mask and each pixel of the horizontal mirror of the lower half-mask, so as to superpose the pixels corresponding to reinforcing cords visible in the two half-specimens.

In a fourth step 4b, the folded binary mask image is expanded using a structuring element having a horizontal line shape of width F:

$F=\text{intercord}-\text{diametercord}+1$ where:
Intercord: distance between two reinforcing cords
Diametercord: diameter of a reinforcing cord.

Next, an AND logic operation is carried out between the folded binary mask image and the fitted theoretical image so as to obtain an image referred to as the expanded folded binary mask image. This image contains information on the segments of the fitted theoretical image that contain bare cords.

Next, a morphological reconstruction based on the expanded folded binary mask image is carried out.

On a horizontal line, any piece of bare cord must count as a line of cord. To take into account this assumption, a linewise morphological reconstruction is carried out with, as marker, the expanded folded binary mask image and, as mask, the fitted theoretical image in order to obtain an image referred to as a modified folded binary mask image.

Figure 12:
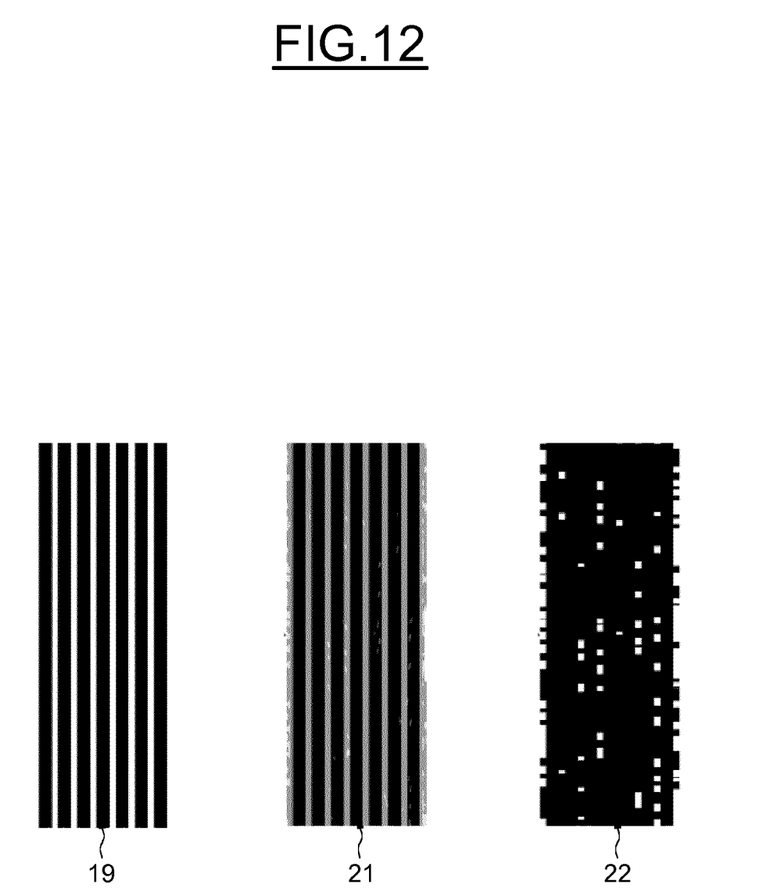
FIG. 12 illustrates a theoretical image of reinforcing cords, a superposition between the folded binary mask image and the fitted theoretical image and a modified folded binary mask image.

FIG. 12 illustrates a fitted theoretical image 19 of reinforcing cords, a superposition of a folded binary mask image and a fitted theoretical image 21, and a modified folded binary mask image 22.

Figure 6:
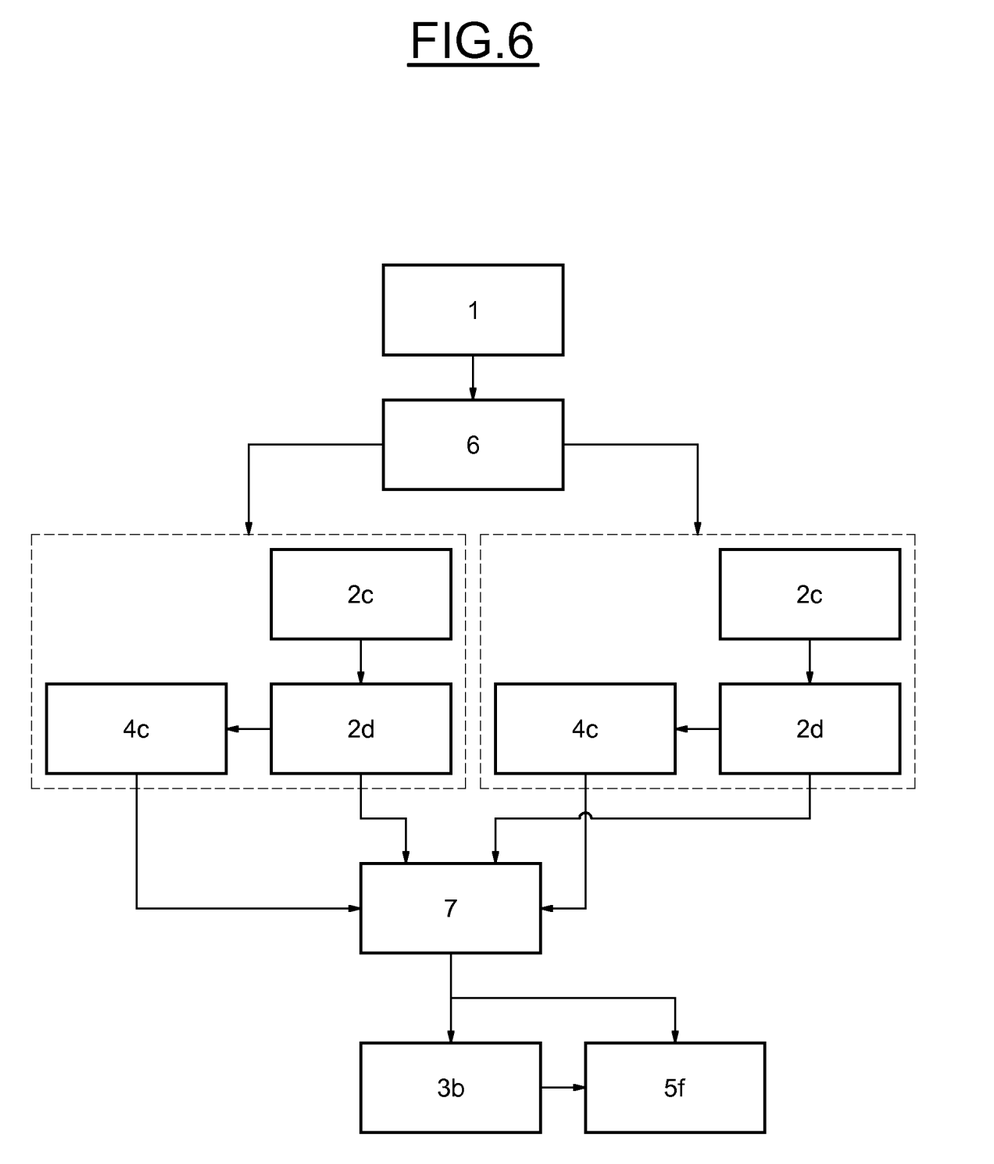
FIG. 6 illustrates the main steps of a sixth embodiment of an estimating method according to the invention.

The estimating method then ends with a fifth step 5e of determining a score N quantifying the degree of overlap of the reinforcing cords and of the rubber composition:

$N=1-(\text{modified folded binary mask image metal area})/(\text{theoretical image metal area})$ In a sixth embodiment illustrated in FIG. 6, in a partitioning step 6 two segmentation binary mask half-images are determined from the segmentation binary mask image by separating it into 2 sub-images of the same size along a horizontal line.

For each segmentation binary mask half-image, the following steps are carried out:

In a step 2c of generating a theoretical half-image, a theoretical model is used to make the image of the half-specimens exploitable by giving them a reference area that corresponds to the reinforcement alone.

Since the pitch of the reinforcing cords and their diameter in the specimen and the pixels/mm transfer function of the image-acquiring device are known, it is possible to generate a theoretical half-image of the bare reinforcing cords corresponding to the segmentation half-mask. By reinforcing cord, what is meant is the textile or metal reinforcing fibres of a reinforcing layer used in the production of the specimen.

In a step 2d of fitting the theoretical half-image, an AND logic operation is carried out between the theoretical half-image and the segmentation binary mask half-image then the deviation in position between the cords of the theoretical half-image and those of the segmentation binary mask half-image is measured by taking the sum of pixels of non-zero Boolean value of the image obtained using the AND logic operation.

The measurement of this deviation is repeated by determining a new theoretical half-image having a value of pitch and of position of the first cord comprised in an interval of values of pitch and of positions of the first cord that are defined beforehand about initial values of the theoretical model. The values of pitch and of position of the first cord retained are those that lead to the highest deviation value.

Next, a fitted theoretical half-image is determined depending on the pitch of the cords and on the position of the first cord after variation and their diameter in the tyre.

In a fourth step 4c, the segmentation binary mask half-image is expanded using a structuring element having a horizontal line shape of width F:

$F=\text{intercord}-\text{diametercord}+1$ where:
Intercord: distance between two reinforcing cords
Diametercord: diameter of a reinforcing cord.

In a step 7, an AND logic operation is then carried out between the expanded segmentation binary mask half-image and the fitted theoretical half-image of the reinforcing cords so as to obtain an expanded segmentation binary mask half-image. This half-image contains information on the segments of the theoretical half-image that contain bare cords.

At this stage of the method, one expanded segmentation binary mask half-image is obtained for each segmentation binary mask half-image.

The method then continues with a step 3b of determining an aligned folded binary mask image from the expanded segmentation binary mask half-images.

This step is based on the folding third steps 3a described in the preceding embodiments, which steps are modified so as to add a search for the best offset between the half-specimens.

Specifically, the folding steps 3a describe a simple fold consisting in mirroring one of the expanded segmentation half-masks and in performing an OR logic operation with the other half-mask, then computing the score.

The present variant consists in carrying out a third substep in which a horizontal offset is applied to the image of the second half-specimen resulting from the first substep in which a horizontal mirroring operation is carried out. Next, the second substep in which an OR logic operation is carried out is carried out.

The estimating method continues with a fifth step 5f of determining a score N quantifying the degree of overlap of the reinforcing cords and of the rubber composition:

$N=1-(\text{aligned folded binary mask image metal area})/(\text{fitted theoretical image metal area})$ The score and the associated horizontal offset are then stored in memory.

The third substep, the second substep and the computation of the score are then repeated for at least one different horizontal offset. The horizontal offsets are chosen in an interval of plus or minus two pitch deviations.

The method ends with the determination of the final score and of the associated offset. The final score is equal to the minimum value among all of the determined scores. Such an embodiment makes it possible to take into account left-right offsets between half-specimens and to choose the best superposition between half-masks (which leads to the mini note).

The estimating method thus allows the degree of coverage of the reinforcing cords by the rubber composition after a stripping by peeling test has been carried out on a sample to be estimated. This method has an improved reproducibility and an improved objectivity with respect to visual inspection by a human operator because of the segmentation and of the thresholding binary masks employed.

The invention claimed is:

1. A method for estimating a score of adhesion between a rubber composition and reinforcing plies of a specimen representative of a tire to be characterized, the specimen comprising at least two reinforcing plies embedded in the rubber composition, each reinforcing ply itself comprising reinforcing cords placed beside one another, the method comprising the following steps:
   baking the specimen under pressure;
   then carrying out a stripping test by peeling apart two reinforcing plies of the specimen, thus resulting in two half-specimens;
   acquiring at least one image of the two half-specimens obtained at the end of the stripping test;
   trimming the acquired at least one image;
   determining a first image separating reinforcement regions from regions of rubber composition based on the at least one trimmed acquired image via superpixel decomposition, the first image being selected from a segmentation binary mask image, a folded binary mask image, a modified segmentation binary mask image, a modified folded binary mask image and an aligned folded binary mask image;
   determining a second image of the reinforcing cords based on a spacing and on a diameter of the reinforcing cords of the tire, the second image being selected from a theoretical image and a fitted theoretical image; and
   determining a score based on a ratio of an area of the reinforcing cords in the first image to an area of the reinforcing cords in the second image.

2. The method according to claim 1, wherein the at least one image of the two half-specimens is acquired with a flatbed scanner.

3. The method according to claim 1, wherein the at least one image of the two half-specimens is acquired with a flatbed scanner in conjunction with use of a rigid half-specimen holder configured to control a manner in which each half-specimen is pressed against a window of the flatbed scanner and an alignment in an acquisition region of the flatbed scanner.

4. The method according to claim 1, wherein trimming the at least one acquired image comprises:
   removing the color components of the at least one acquired image so as to obtain a greyscale image;
   applying a greyscale threshold so that pixels having greyscales lower than the threshold are attributed a first Boolean value and pixels having greyscales higher than or equal to the threshold are attributed a second Boolean value, the greyscale threshold being selected so as to remove background image and preserve the at least one image of the two half-specimens;
   determining a binary mask of same size as the greyscale image, in which mask each pixel of the at least one image to be trimmed is associated with the first or second Boolean value;
   carrying out closing morphological filtering on the binary mask in order to join the two half-specimens; and
   carrying out opening morphological filtering on the filtered binary mask in order to remove noise.

5. The method according to claim 1, wherein the first image is a segmentation binary mask image, and
   wherein determining the first image comprises:
      applying a superpixel decomposition to the at least one trimmed image; and
      then determining a segmentation binary mask containing superpixels having both an eccentricity higher than an eccentricity threshold and a brightness higher than a brightness threshold.

6. The method according to claim 1, wherein the second image is a fitted theoretical image, and
   wherein determining the second image comprises:
      carrying out an AND logic operation between a segmentation binary mask image and a theoretical image;
      then measuring a deviation in position between the cords of the theoretical image and the cords of the segmentation binary mask image by taking a sum of pixels of non-zero Boolean value, the measurement of the deviation being repeated in an interval of values of pitch and of positions of the first cord that are defined beforehand by initial values;
      retaining the values of pitch and of positions of the first cord associated with the highest value among the determined deviation values; and
      determining a fitted theoretical image based on the retained values of pitch of the cords and of position of the first cord and on a diameter of the cords.

7. The method according to claim 1, wherein the first image is a modified segmentation binary mask image, and
   wherein determining the first image comprises:
      if a fitted theoretical image is not available, expanding a segmentation binary mask using a structuring element representing a horizontal line of width depending on a distance between two reinforcing cords and on a diameter of a reinforcing cord;
      then carrying out an AND logic operation between a theoretical image of the reinforcing cords and the image obtained at the end of the expanding so as to obtain an expanded segmentation binary mask image; and
      carrying out a linewise morphological reconstruction with, as marker, the expanded segmentation binary mask image and, as mask, the theoretical image in order to obtain the modified segmentation binary mask image; or
      if a fitted theoretical image is available, expanding a segmentation binary mask using a structuring element representing a horizontal line of width depending on a distance between two reinforcing cords and on a diameter of a reinforcing cord;
      carrying out an AND logic operation between a fitted theoretical image of the reinforcing cords and the image obtained at the end of the expanding so as to obtain an expanded segmentation binary mask image; and
      carrying out a linewise morphological reconstruction with, as marker, the expanded segmentation binary mask image and, as mask, the fitted theoretical image in order to obtain a modified segmentation binary mask image.

8. The method according to claim 1, wherein the first image is a folded binary mask image, and wherein determining the first image in order to avoid false positives comprises:
- carrying out a horizontal mirroring operation on a lower portion of a segmentation binary mask image corresponding to one half-specimen; and
- determining a folded binary mask image by carrying out an OR logic operation between each pixel of the upper half-mask and each pixel of the horizontal mirror of the lower half-mask, so as to superpose the pixels corresponding to reinforcing cords visible in the two half-specimens.

9. The method according to claim 8, wherein the second image is a fitted theoretical image, and
wherein determining the second image comprises:
- carrying out an AND logic operation between the folded binary mask image and the theoretical image;
- then measuring a deviation in position between the cords of the theoretical image and the cords of the folded binary mask image by taking a sum of pixels of non-zero Boolean value, the measurement of the deviation being repeated in an interval of values of pitch and of positions of the first cord that are defined beforehand by initial values;
- retaining the values of pitch and of positions of the first cord associated with the highest value among the determined deviation values; and
- determining a fitted theoretical image based on the retained values of pitch of the cords and of position of the first cord and on diameter of the cords.

10. The method according to claim 8, wherein the first image is a modified folded binary mask image, and
wherein determining the second image comprises:
- if a fitted theoretical image is not available, expanding the folded binary mask image using a structuring element representing a horizontal line of width depending on a distance between two reinforcing cords and on a diameter of a reinforcing cord;
- then carrying out an AND logic operation between the theoretical image of the reinforcing cords and the image obtained at the end of the expanding so as to obtain an expanded folded binary mask image; and
- carrying out a linewise morphological reconstruction with, as marker, the expanded folded binary mask image and, as mask, the theoretical image in order to obtain a modified folded binary mask image; or
- if a fitted theoretical image is available, expanding the folded binary mask image using a structuring element representing a horizontal line of width depending on a distance between two reinforcing cords and on a diameter of a reinforcing cord;
- then carrying out an AND logic operation between the fitted theoretical image of the reinforcing cords and the image obtained at the end of the expanding so as to obtain an expanded folded binary mask image; and
- carrying out a linewise morphological reconstruction with, as marker, the expanded folded binary mask image and, as mask, the fitted theoretical image in order to obtain a modified folded binary mask image.

11. The method according to claim 1 further comprising:
- determining two segmentation binary mask half-images from a segmentation binary mask image, wherein, for each segmentation binary mask half-image, a theoretical half-image is determined, a fitted theoretical half-image is determined based on the theoretical half-image and the segmentation binary mask half-image, and an expanded segmentation binary mask half-image is determined based on the segmentation binary mask half-image and the fitted theoretical half-image;
- then carrying out a horizontal mirroring operation on the expanded segmentation binary mask half-image corresponding to a lower portion of the segmentation binary mask image and to one half-specimen;
- applying a horizontal offset to the image of the half-specimen resulting from the horizontal mirroring operation; and
- determining a folded binary mask image by carrying out an OR logic operation between each pixel of an upper half-mask and each pixel of the horizontal mirror of a lower half-mask, so as to superpose the pixels corresponding to reinforcing cords visible in the two half-specimens.

12. The method according to claim 1, wherein at least two scores each corresponding to one horizontal offset are determined, and then a final score is determined as the minimum score among the set of scores obtained for each horizontal offset.

* * * * *